US009986461B2

(12) United States Patent
Dao et al.

(10) Patent No.: US 9,986,461 B2
(45) Date of Patent: May 29, 2018

(54) ON-DEMAND RADIO COORDINATION IN A SOFTWARE-DEFINED NETWORK

(71) Applicant: Huawei Technologies Co., Ltd., Shenzhen (CN)

(72) Inventors: Ngoc Dung Dao, Ottawa (CA); Hang Zhang, Nepean (CA); Xu Li, Nepean (CA)

(73) Assignee: Huawei Technologies Co., LTD, Shenzhen (CN)

( * ) Notice: Subject to any disclaimer, the term of this patent is extended or adjusted under 35 U.S.C. 154(b) by 230 days.

(21) Appl. No.: 14/581,867

(22) Filed: Dec. 23, 2014

(65) Prior Publication Data
US 2015/0181465 A1 Jun. 25, 2015

Related U.S. Application Data

(60) Provisional application No. 61/920,650, filed on Dec. 24, 2013.

(51) Int. Cl.
*H04L 12/28* (2006.01)
*H04W 28/08* (2009.01)
(Continued)

(52) U.S. Cl.
CPC .......... *H04W 28/08* (2013.01); *H04B 7/0617* (2013.01); *H04L 47/122* (2013.01);
(Continued)

(58) Field of Classification Search
CPC . H04W 28/06; H04W 28/0231; H04W 28/08; H04W 24/02; H04W 28/0247;
(Continued)

(56) References Cited

U.S. PATENT DOCUMENTS 7,724,656 B2 * 5/2010 Sågfors .................. H04L 47/12
370/229
8,107,440 B2 * 1/2012 Nadas ................... H04L 1/0002
370/229
(Continued)

FOREIGN PATENT DOCUMENTS

CN        101415207 A     4/2009
CN        102123444 A     7/2011
(Continued)

OTHER PUBLICATIONS

Zhu, D., et al., "Traffic and Interference-Aware Dynamic BBU-RRU Mapping in C-RAN TDD With Cross-Subframe Coordinated Scheduling/Beamforming," 2013 IEEE International Conference on Communications Workshops (ICC), Jun. 9-13, 2013, pp. 884-889, Budapest.

*Primary Examiner* — Hanh N Nguyen
(74) *Attorney, Agent, or Firm* — Slater Matsil, LLP

(57) ABSTRACT

A network includes network components configured to perform a method for on-demand radio coordination. The method includes determining a congested radio node in a plurality of radio nodes in the network in response to congestion information received from a network device. The method includes generating a cluster of radio nodes associated with the congested radio node. The method also includes optimizing radio resources of the radio nodes in the cluster to produce cluster optimization results configured to alleviate congestion of the congested radio node. The method further includes transmitting the cluster optimization results to the radio nodes in the cluster to alleviate the congestion.

21 Claims, 6 Drawing Sheets

(51) Int. Cl.
*H04L 12/803* (2013.01)
*H04B 7/06* (2006.01)
*H04W 28/16* (2009.01)
*H04W 28/02* (2009.01)
*H04L 12/917* (2013.01)
*H04W 24/08* (2009.01)

(52) U.S. Cl.
CPC ......... *H04L 47/76* (2013.01); *H04W 28/0284* (2013.01); *H04W 28/16* (2013.01); *H04W 24/08* (2013.01)

(58) Field of Classification Search
CPC ............. H04W 28/02; H04W 28/0289; H04W 28/0284; H04W 28/0215; H04W 74/18; H04W 72/0486; H04L 47/12; H04L 1/0002
USPC ............ 370/229–236, 338, 468, 395.21, 351
See application file for complete search history.

(56) References Cited

U.S. PATENT DOCUMENTS

| | | | |
|---|---|---|---|
| 8,493,860 B2* | 7/2013 | Racz | H04L 47/12 370/233 |
| 9,642,146 B2* | 5/2017 | Zhang | H04W 72/0486 |
| 2003/0117964 A1 | 6/2003 | Chen et al. | |
| 2005/0107091 A1 | 5/2005 | Vannithamby et al. | |
| 2012/0106346 A1* | 5/2012 | Aguirre | H04W 28/08 370/237 |
| 2013/0336121 A1 | 12/2013 | Ge | |
| 2014/0269364 A1* | 9/2014 | Knapp | H04W 24/02 370/252 |
| 2014/0362688 A1* | 12/2014 | Zhang | H04W 28/0289 370/230 |
| 2015/0124604 A1* | 5/2015 | Dao | H04W 28/0247 370/231 |
| 2016/0142940 A1* | 5/2016 | Teo | H04W 28/08 370/235 |

FOREIGN PATENT DOCUMENTS

| | | |
|---|---|---|
| CN | 102905229 A | 1/2013 |
| EP | 2538603 A1 | 12/2012 |
| EP | 2914025 A1 | 9/2015 |
| JP | 2003199144 A | 7/2003 |
| JP | 2006270207 A | 10/2006 |
| JP | 2008166995 A | 7/2008 |
| JP | 2013537751 A | 10/2013 |
| WO | WO 2012/159462 A1 | 11/2012 |
| WO | 2013163745 A1 | 11/2013 |

* cited by examiner

ON-DEMAND RADIO COORDINATION IN A SOFTWARE-DEFINED NETWORK

CROSS-REFERENCE TO RELATED APPLICATIONS

The present application claims priority to U.S. provisional Application No. 61/920,650 entitled "ON-DEMAND RADIO COORDINATION IN A SOFTWARE-DEFINED NETWORK" and filed on Dec. 24, 2013, the content of which is incorporated herein by reference.

TECHNICAL FIELD

The present disclosure provides a framework for coordination of radio nodes in software-defined networks.

BACKGROUND

In a cellular network, co-channel interference (CCI) because of frequency reuse is one of the factors that limit system capacity. Many measures to mitigate CCI have been studied and applied in cellular systems. For example, soft frequency reuse in power and frequency domains, enhanced inter-cell interference coordination (eICIC) in the time domain, and coordinated multi-point (CoMP) transmission in the downlink and reception in the uplink have been specified in LTE releases.

With the evolution of 4G LTE systems, coordinated multi-point (CoMP) transmission has been shown to be a pragmatic. In CoMP transmission, transmission parameters of multiple radio nodes are harmonized by a centralized controller such that the interference can be effectively avoided. However, CoMP schemes often require additional signaling overhead and computational power. With the current LTE network architecture, it may be costly to deploy some CoMP schemes. Additionally, the closed design of enhanced packet core (EPC) architecture may only allow vendor-specific CoMP schemes.

SUMMARY

This disclosure is directed to a system and method for on-demand radio coordination.

According to one embodiment, there is provided a method in a network component for providing radio access network (RAN) coordination of network devices in a network. The method includes determining a congested radio node in a plurality of radio nodes in the network in response to congestion information received from at least one network device. The method includes generating a cluster of radio nodes associated with the congested radio node. The method also includes optimizing radio resources of the radio nodes in the cluster to produce cluster optimization results configured to alleviate congestion of the congested radio node. The method further includes transmitting the cluster optimization results to the radio nodes in the cluster to alleviate the congestion.

In another embodiment, there is provided an apparatus for providing radio access network (RAN) coordination of network devices in a network. The apparatus includes a processor, and memory coupled to the processor comprising instructions that, when executed by the processor, cause the apparatus to perform operations comprising: determining a congested radio node in a plurality of radio nodes in the network in response to congestion information received from a network device; generating a cluster of radio nodes associated with the congested radio node; optimizing radio resources of the radio nodes in the cluster to produce cluster optimization results configured to alleviate congestion of the congested radio node; and transmitting the cluster optimization results to the radio nodes in the cluster to alleviate the congestion.

In another embodiment, there is provided a non-transitory computer readable medium embodying a computer program. The computer program includes computer readable program code for determining a congested radio node in a plurality of radio nodes in the network in response to congestion information received from a network device; generating a cluster of radio nodes associated with the congested radio node; optimizing radio resources of the radio nodes in the cluster to produce cluster optimization results configured to alleviate congestion of the congested radio node; and transmitting the cluster optimization results to the radio nodes in the cluster to alleviate the congestion.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
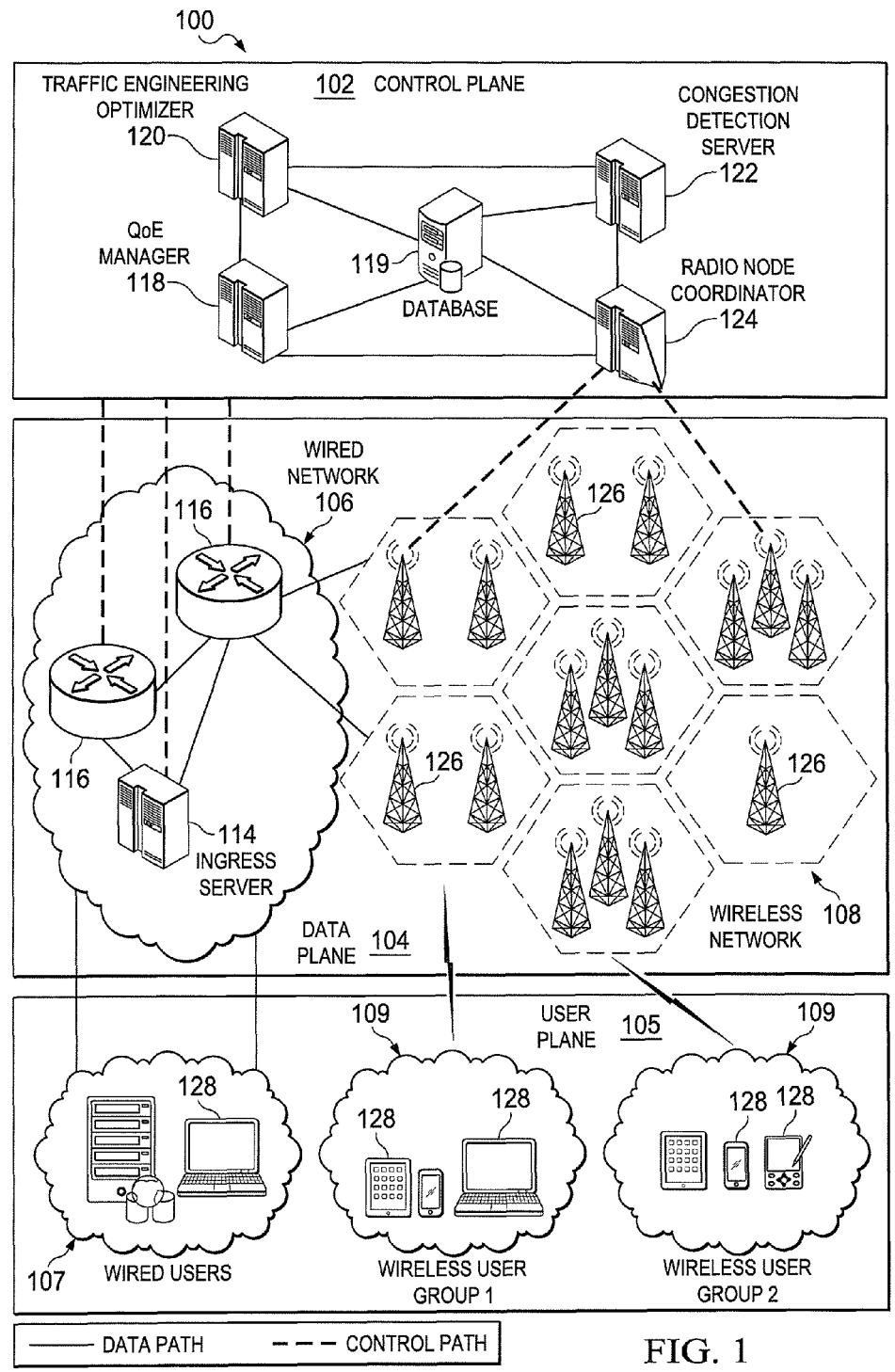
FIG. 1 illustrates a block diagram of a system for on-demand radio coordination (RC) in a software-defined network (SDN) according to one embodiment.

The present disclosure will be described with respect to example embodiments in a specific context, namely communications systems for on-demand radio coordination in a software-defined network. The disclosure may be applied to standards compliant communications systems, such as those that are compliant with Third Generation Partnership Project (3GPP), IEEE 802.11, and the like, technical standards, and non-standards compliant communications systems, that use advanced multiple access techniques. During the description, certain wireless technologies, such as LTE, may be mentioned. However, it should be understood that the embodiments may be applied to other technologies, such as GSM (Global System for Mobile Communication), UMTS (Universal Mobile Telecommunication System) and future wireless communication technologies, for example, cellular wireless network which does not have cell-IDs.

In an LTE network, operation parameters of radio nodes can be automatically configured by a Self-Organizing Network (SON) entity. The SON can perform load balancing among eNBs and/or power on/off by monitoring radio resource usage. The SON can be implemented in distributed or centralized architecture. When implemented in distributed architecture, each eNB has SON functionality to process information. When implemented in centralized architecture, data from eNBs is centrally processed. One disadvantage of the SON is that operation is passive in that the SON just reacts to the amount of traffic that comes to the eNB.

Operation of radio nodes can be centrally controlled by an entity referred to as a radio coordinator. In LTE network architecture, the radio coordinator can reside in the E-UTRAN domain or in the enhanced packet core (EPC) domain.

If the radio coordinator is in the E-UTRAN domain, the radio coordinator can be collocated in the same site with the eNB to control several baseband units of radio nodes. This configuration requires one radio coordinator per cluster of radio nodes, which may prevent sharing of computing power of dedicated computer processors when radio coordinator processors are not in use.

The radio coordinator could be logically or physically located in the EPC domain. Because the EPC is a closed system with standardized interfaces and dedicated hardware, the radio coordinator not only needs dedicated hardware but may also be unable to work with the EPC of other vendors. These issues will also increase investment and operation costs (e.g., CAPEX and OPEX).

In addition to the costs of deploying and operating radio coordination, the current architecture of LTE may limit the effectiveness of radio coordination. For example, the data rate of traffic flows may be unknown, the radio coordinator may be passively aware of congestion at the radio nodes only by looking at the buffer statistics of radio nodes. Future networks should be able to prevent congestion before it happens.

Disclosed herein are architectures, systems, and methods for a framework with software-defined networking (SDN) based architecture for coordination of a radio access network (RAN). This framework takes advantage of traffic engineering information to proactively control parameters of radio nodes (RNs) in an on-demand basis. The framework is flexible to provide on-demand services for congestion control and/or energy consumption optimization for the network in the time domain or geographical domain.

FIG. 1 is a block diagram of an embodiment of a system 100 for on-demand RAN coordination in an SDN. The system 100 includes a control plane 102, a data plane 104, and a user plane 105.

The user plane 105 may include multiple sets of users (e.g., wired users 107 and/or wireless users 109) classified by type of connection (e.g., wired connection or wireless connection) and/or class of services. The user plane 105 includes user equipment (UEs) 128. The UEs 128 are configured to transmit and/or receive wireless signals or wired signals.

The data plane 104 performs data forwarding among users and includes a wired network 106 and a wireless network 108. The wired network 106 includes an ingress server 114 and a plurality of core routers 116. The wireless network 108 includes a plurality of radio nodes (RNs) 126. Each RN 126 has a local scheduler (not shown) to forward data packets to wireless users, although operation of local schedulers can be coordinated by a higher level scheduler.

The control plane 102 provides network control functionalities and includes a quality-of-experience (QoE) manager 118, a traffic engineering optimizer 120, a congestion detection server 122, a radio node coordinator 124, and a database 119.

The QoE manager 118 is configured to collect and process quality-of-service or QoE reports sent from users. The QoE manager 118 is configured to use the QoE reports to manipulate the operation of other entities of the control plane 102 and may manipulate the operation of the RNs 126 in the data plane 104. For example, the QoE manager 118 is configured to analyze QoE performance (e.g., user satisfaction) of traffic flows based on feedback of QoE metrics from users' applications or feedback from data forwarding units of the data plane 104, such as the RNs 126 and the routers 116.

When the radio node coordinator 124 selects radio node clusters for optimization (as described in further detail below with respect to FIGS. 2 and 3), it uses the QoE performance of flows provided by the QoE manager 118. The radio node coordinator 124 sends requests to the QoE manager 118 to analyze the impact of congestion to some flows for both cases of optimized and non-optimized clusters. The radio node coordinator 124 will then use the QoE information of flows, together with costs (e.g., transmission costs) to run optimization and to implement the solution in the network, to select clusters for optimization.

The database 119 is configured to store network status. For example, the database 119 may store a load condition in the RNs 126, the QoE status of users' applications, flow rate allocation, spectral efficiency of radio nodes, etc.

The traffic engineering optimizer 120 is configured to determine routes from a traffic source to a destination and determine flow demand and resource allocation information for each route, such as rate assignment for each flow. For example, the traffic engineering optimizer 120 is configured to update the database 119 with assigned rates of flow for each link of the network whenever the traffic engineering optimizer 120 makes a decision. The traffic engineering optimizer 120 is configured to inform the radio node coordinator 124 of congested radio nodes.

Even if the clusters of radio nodes are reconfigured to solve congestion, the buffer of radio nodes could still be filled-up due to the limited capacity of users' wireless channels. In this case, radio node coordinator 124 can inform the traffic engineering optimizer 120 the latest parameters of radio nodes so that the traffic engineering optimizer 120 can make new routing decisions to divert traffic to other, less congested radio nodes.

The congestion detection server 122 is configured to detect congestion in the RNs 126 by analyzing loads and/or by analyzing traffic engineering information received from the traffic engineering optimizer 120. The congestion detection server 122 is configured to detect congestion either before (proactive detection) or after (reactive detection) it happens. In response to the congestion detection server 122 detecting congestion, the radio node coordinator 124 will formulate one or more clusters of radio nodes based on costs to optimize and implement the solution as described in further detail below with respect to FIGS. 2 and 3. If congestion happens to multiple radio nodes, multiple clusters can be created. The radio node coordinator 124 will analyze the QoE of flows and the cost to run and implement optimization solutions. Then the radio node coordinator 124 will determine which clusters to be optimized.

The radio node coordinator 124 is configured to provide RAN coordination functions either on-demand or on a regular basis and is configured to coordinate the operation of multiple radio nodes. In an embodiment, the radio node coordinator 124 comprises a computing resource pool which can be dynamically used in an on-demand basis. For example, the computing resources may be used to run an optimization process that optimizes transmission parameters of a radio node cluster.

The radio node coordinator 124 is "activated" in response to congestion occurring at an RN 126. For example, the traffic engineering optimizer 120 can inform the congestion detection server 122 of a potential or existing congestion condition, and the congestion detection server 122 can verify the congestion condition by determining whether the congestion condition is a "false" alarm or a "true" alarm. The congestion detection server 122 notifies the radio node coordinator 124 in response to verifying the congestion condition.

In addition to eliminating congestion, the radio node coordinator 124 also monitors radio resource utilization in order to improve spectrum utilization and energy saving. For example, the radio node coordinator 124 can be activated by analyzing the resource utilization of the RNs 126. To illustrate, the radio node coordinator 124 can send requests for status updates to radio nodes to obtain up-to-date resource utilization information, buffer information, and UE channel information. When the resource utilization of radio nodes is lower than a threshold for a certain period, the radio node coordinator 124 can be activated to minimize the unused resources (e.g., spectrum and transmit power) without causing outage to the current traffic flows.

In an embodiment, it is assumed that the nominal demand of traffic flows is known when flows are admitted to the network. Nevertheless, the instantaneous rate of flows, for example in video streams, may vary over the time. The network resource allocation is managed by the traffic engineering optimizer 120. The traffic engineering optimizer 120 is configured to select routes and corresponding bandwidth allocations for flows. When packets arrive at an RN 126, the RN 126 will make a decision with regard to forwarding packets to users.

At the user side, traffic sinks in an application layer will consume received packets. Traffic sinks could send QoE feedback messages to the QoE manager 118 for online monitoring and improving user experience. QoE metrics can be defined for individual traffic. As an illustrative example, 3GPP LTE specifies QoE metrics for video progressive downloading and dynamic adaptive streaming over HTTP services.

The QoE manager 118 is configured to provide a recommendation on resource allocation priority of flows. This recommendation is taken into account during resource allocation decisions, such as from the traffic engineering optimizer 120 and the radio node scheduler, and other entities such as the radio node coordinator 124, for better fairness among users. For example, if some flows report poor QoE, the QoE manager 118 could recommend adjusting a traffic engineering priority of these flows so that the traffic engineering optimizer 120 would assign more resources of one or more of the RNs 126 to help these users. In addition, the QoE manager 118 can compute packet priorities for schedulers of one or more of the RNs 126.

Figure 2:
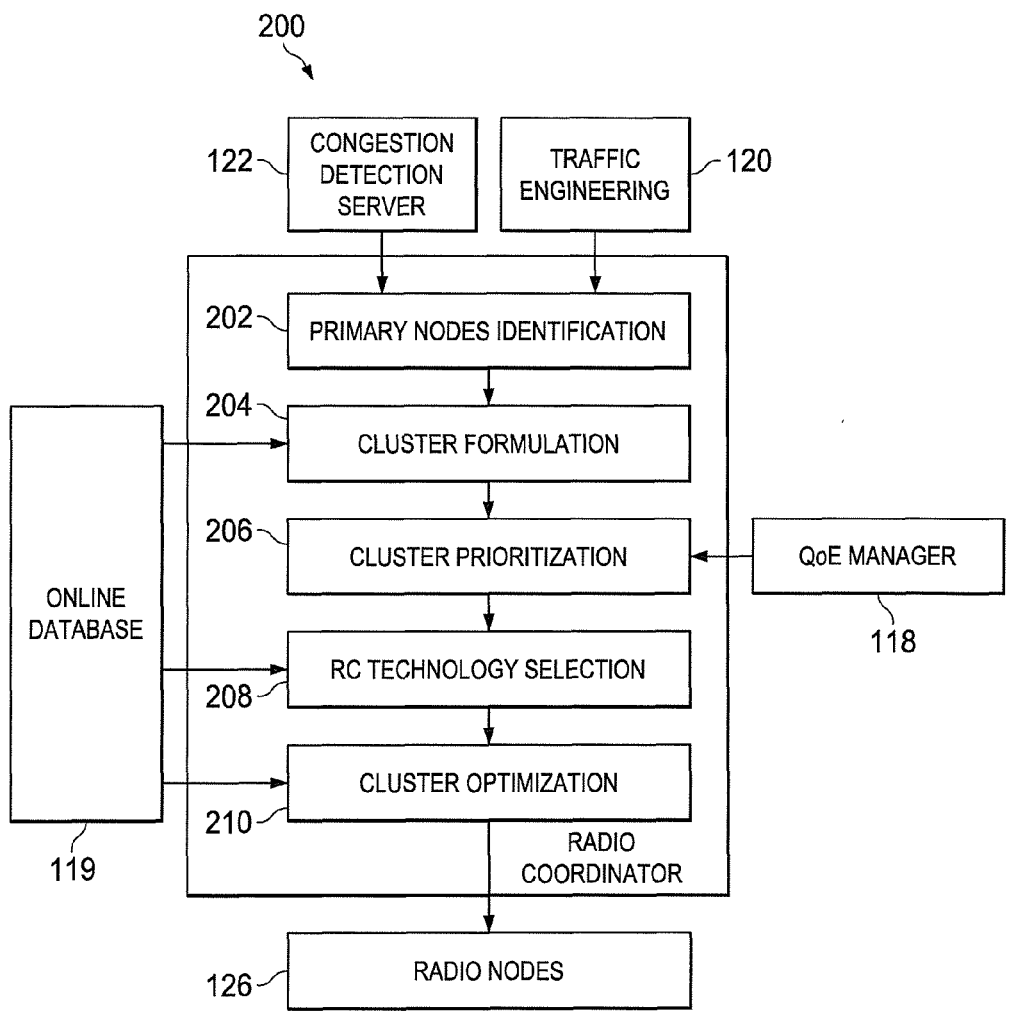
FIG. 2 illustrates a block diagram of an embodiment of a radio node coordinator in a radio access network coordination system according to one embodiment.

FIG. 2 is a diagram illustrating a RAN coordination system 200. The system 200 includes a block diagram of an embodiment of the radio node coordinator 124. The radio node coordinator 124 includes a primary nodes identification module 202, a cluster formulation module 204, a cluster prioritization module 206, a radio coordinator technology selection module 208, and a cluster optimization module 210.

The primary nodes identification module 202 is configured to identify congested nodes. The primary nodes identification module 202 receives information from the congestion detection server 122 and the traffic engineering optimizer 120 to determine whether congestion could happen. There are a number of techniques to identify congestion. Conventional approaches include statistical measurements of quality-of-service (QoS) of flows to determine congestion. QoS metrics may be associated with packet delay, jitter, etc. In addition, the statistics of resource utilization of radio nodes can also be used for congestion detection.

Advanced congestion detection methods should be able to proactively detect congestion before it happens, for example by analyzing resource allocation information from the traffic engineering optimizer 120. When the required radio resource to meet the flow demands is larger than the available resource of the RNs 126, congestion will likely happen in the future. In any case, the traffic engineering optimizer 120 can provide the average resource allocation over a period of time. Some flows like real-time video may have high peak-to-mean rate ratio and cause short-term outage. Complementary congestion detection may occur by monitoring the instantaneous rate of flows. In this way, the system is able to provide a premium QoE guarantee for some class of services.

In response to a congested node being identified, a cluster of RNs surrounding the congested node is generated by the cluster formulation module 204. Each cluster may include one or more congested nodes. The usage of radio resources in each cluster may be later optimized to assist in alleviating the congestion of the congested node or nodes.

The assignment of computing resources for radio coordination from the radio node coordinator 124 to clusters is determined by a cost function. The cost function may be based at least in part on transmission cost and include the QoE of flows in clusters to be optimized, cost of computing resources, and estimated cost to implement the solution in radio nodes.

Information from the QoE manager 118 and the database 119 can be utilized to build clusters. For example, if the cost to run radio coordination is high, some radio nodes could be eliminated from a cluster. Alternatively, or in addition, some radio nodes serving flows with low QoE requirements like best effort traffic may be left out of the cluster to reduce optimization complexity.

Figure 3:
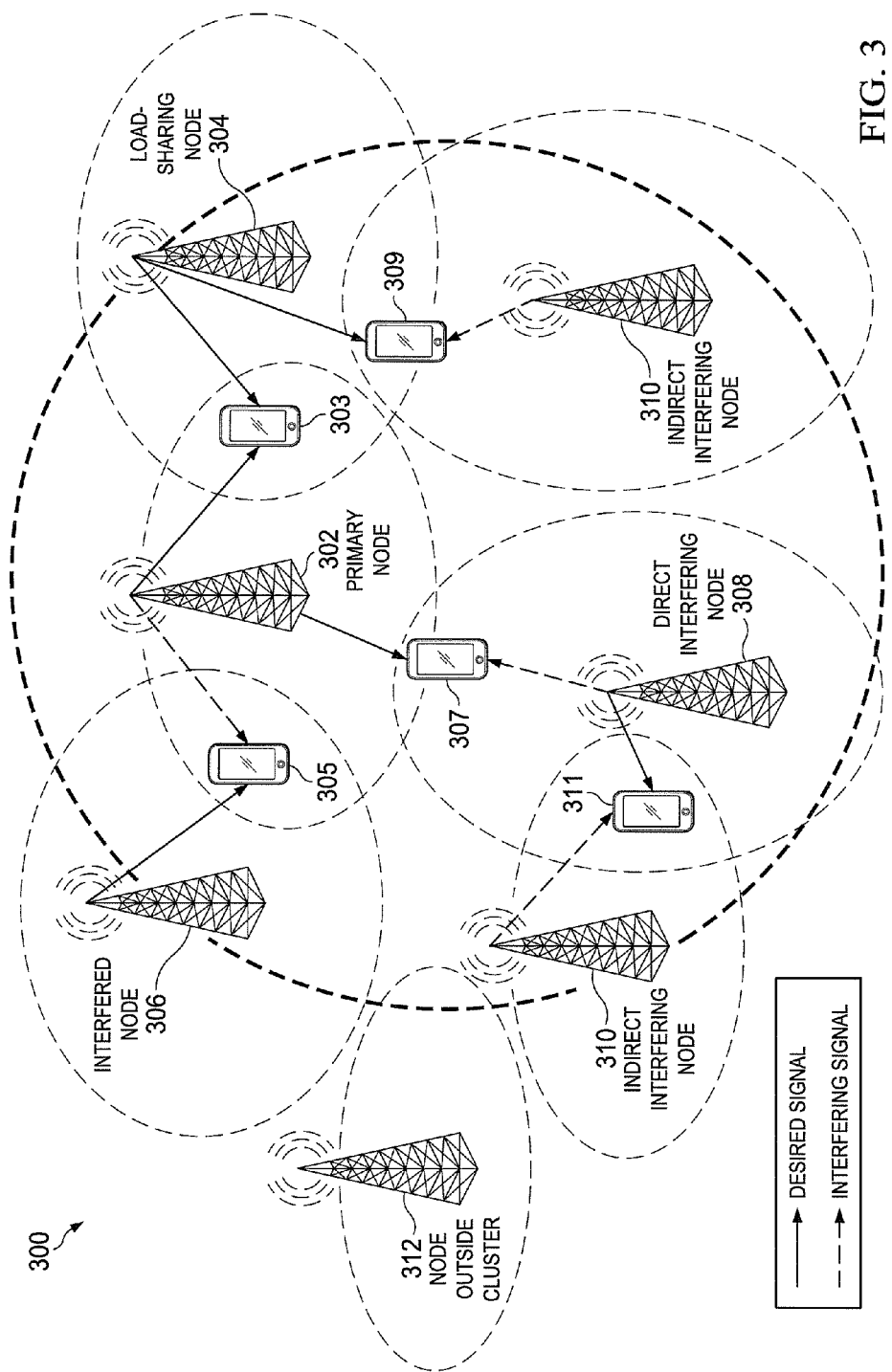
FIG. 3 illustrates formation of an exemplary cluster and notation of various radio nodes within the cluster according to one embodiment.

FIG. 3 illustrates formation of an exemplary cluster 300 and notation of various radio nodes within the cluster 300 including a primary node 302, a load-sharing node 304, an interfered node 306, a direct interfering node 308, and an indirect interfering node 310. To illustrate, a congested node is referred to as the primary node 302. The load-sharing node 304 is a node that sends data to users served by the congested node 302 (e.g., user 303). The interfered node 306 is a node in which users receive interference from the primary node 302 (e.g., user 305). The direct interfering node 308 is a node that causes interference to users of the primary node 302 (e.g., user 307). The indirect interfering node 310 is a node that causes interference to users of the load-sharing node 304 or to users of the direct interfering node 308 (e.g., user 309 and user 311, respectively). A node having no users, such as node 312, is not included in the cluster 300 because it can be turned off. It will be appreciated by those skilled in the art that the cluster 300 may be formed without interfered nodes and indirect interfering nodes. In addition, if congestion is identified in multiple RNs, multiple clusters can be created. Some of the clusters can be merged if they significantly overlap.

Referring back to FIG. 2, in response to the clusters being formed, operation parameters of the clusters may be optimized by the cluster optimization module 210 as described in further detail below. However, if there are more clusters than the number of computing resources, the clusters may be prioritized. The cluster prioritization module 206 is configured to prioritize the clusters so that clusters having a higher priority, such as those clusters having more users in congested nodes, will be processed first.

For example, when multiple clusters are formulated and it is beyond the processing capability of the radio node coordinator 124, then some of the clusters will be processed before others. The clusters may be prioritized as follows: the QoE manager 118 may update the database 119 containing short-term and long-term QoE performance of flows. In case of congestion, the radio node coordinator 124 requests the QoE manager 118 to analyze the short-term and long-term QoE performance of flows if congestion is not fixed. In accordance with the QoE information of impacted flows, together with the available computing resources to implement a solution, the radio node coordinator 124 can prioritize the clusters.

Depending on the physical layer capability and data type of flows, a specific type of radio coordination technology can be selected for cluster optimization. The radio coordination technology selection module 208 is configured to select such a technology. For example, a number of ways to optimize radio resources may be available for a cluster, such as power control, spatial coordination, spectrum allocation, or combinations thereof. A suitable technique could be selected based on cluster size and user location. If there are many users in the cell edge, coordinated multi-point (CoMP) techniques may be helpful. If some users are in the cell center, the serving cells may perform power control to assist the congested nodes. For example, joint beamforming may be helpful for many users in the cell edge, while narrow-band power control could be used if there are many users evenly distributed.

Operation parameters of the clusters are optimized by the cluster optimization module 210 according to an optimization method selected by the radio coordination technology selection module 208. The cluster optimization is performed in accordance with flow routing and radio nodes information received from the database 119 and QoE of flows information received from the QoE manager 118.

Results from the cluster optimization are sent from the radio node coordinator 124 to the RNs 126. It will be appreciated by those skilled in the art that the transmission parameters of RNs could be changed significantly. As a result, other nodes outside the clusters should be made aware of these changes in order to make suitable adjustment. For example, nodes outside the considered clusters may instruct their users to re-estimate the interference and signal-to-noise-plus-interference (SINR).

Figure 4:
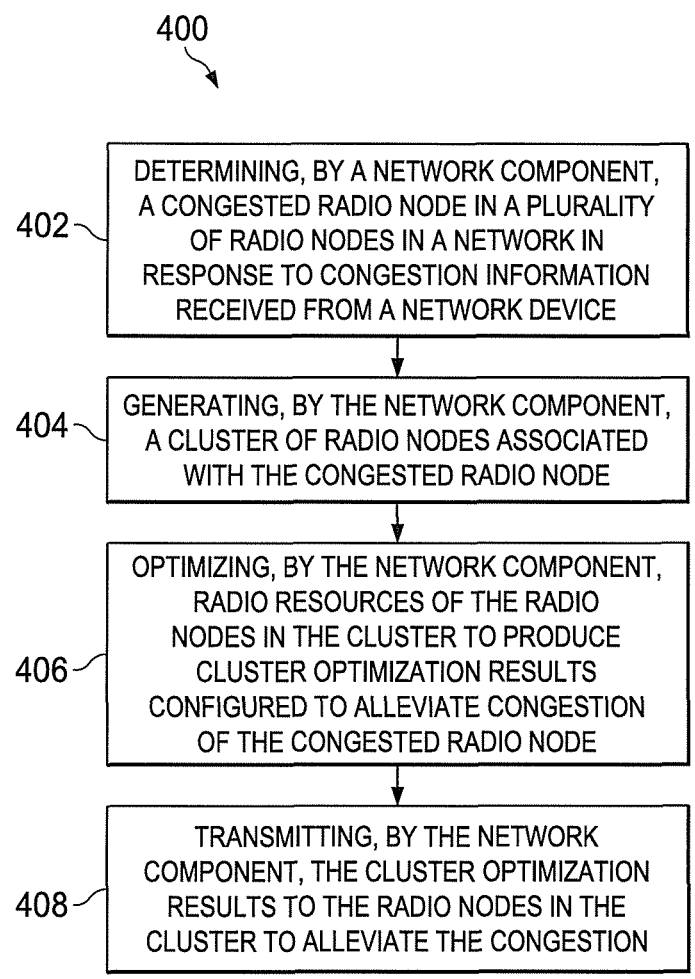
FIG. 4 illustrates an example method for on-demand radio coordination according to one embodiment.

FIG. 4 illustrates an example method 400 for on-demand radio coordination according to one embodiment. For ease of explanation, the method 400 is described as being used with one or more components in FIGS. 1-3. However, the method 400 could be used by any suitable device or in any suitable system or network.

The method 400 includes determining, by a network component, a congested radio node in a plurality of radio nodes in a network in response to congestion information received from a network device, at step 402. For example, the primary nodes identification module 202 receives information from the congestion detection server 122 and the traffic engineering optimizer 120 to determine whether congestion could happen.

A cluster of radio nodes associated with the congested radio node is generated, at step 404. For example, in response to a congested node being identified, a cluster of radio nodes associated with the congested node is generated by the cluster formulation module 204. Information from the QoE manager 118 and the database 119 can be utilized to generate the cluster. For example, some radio nodes could be eliminated from a cluster if the cost (e.g., transmission cost) to run radio coordination is high or if some radio nodes are serving flows with low QoE requirements.

Radio resources of the radio nodes in the cluster are optimized to produce cluster optimization results configured to alleviate congestion of the congested radio node, at step 406. For example, operation parameters of the clusters are optimized by the cluster optimization module 210 according to an optimization method selected by the radio coordination technology selection module 208. This may include selecting a radio coordination technology from a plurality of radio coordination technologies to alleviate congestion of the congested radio node. For example, the radio coordination technology selection module 208 is configured to select a specific type of radio coordination technology in accordance with the physical layer capability and data type of flows. For example, joint beamforming may be helpful for many users in the cell edge, while narrow-band power control could be used if there are many users evenly distributed. The cluster optimization is performed in accordance with flow routing and radio nodes information received from the database 119 and QoE of flows information received from the QoE manager 118.

The cluster optimization results are sent to the radio nodes in the cluster to alleviate the congestion, at step 408. For example, results from the cluster optimization are sent from the radio node coordinator 124 to the RNs 126.

In an embodiment, the method 400 is stored as computer executable instructions on a computer readable media and executed by one or more processors. Although FIG. 4 illustrates one example of a method 400 for on-demand radio coordination, various changes may be made to FIG. 4. For example, while shown as a series of steps, various steps in FIG. 4 could overlap, occur in parallel, occur in a different order, or occur any number of times.

Figure 5:
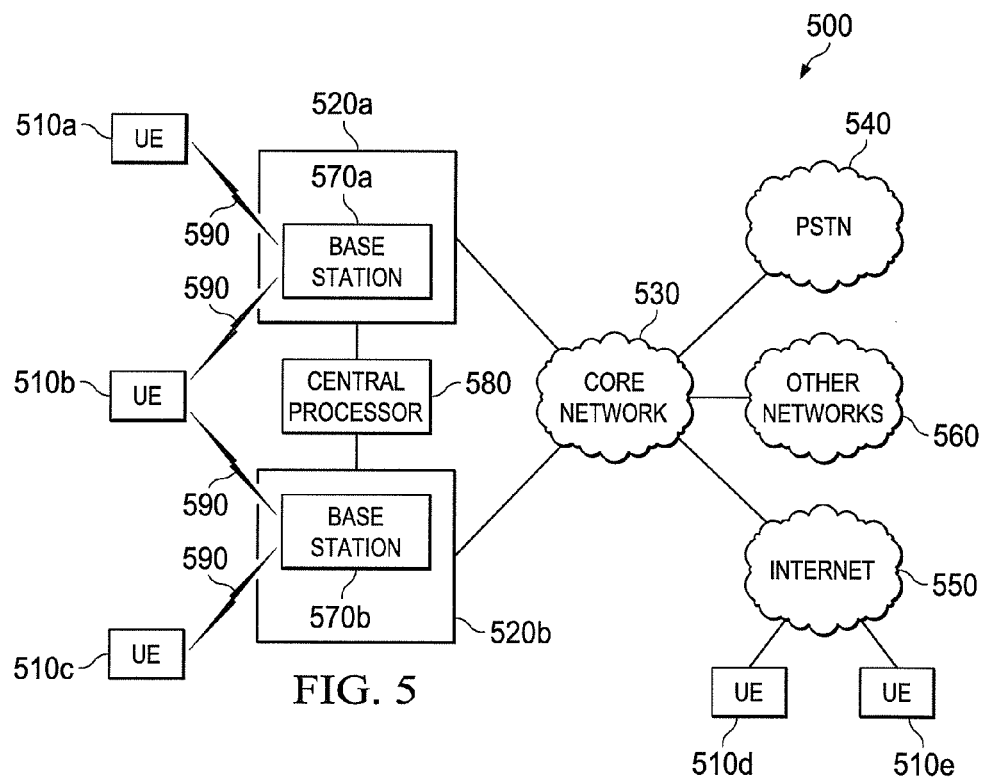
FIG. 5 illustrates an example communication system for on-demand radio coordination according to one embodiment.

FIG. 5 illustrates an example communication system 500 that can implement on-demand radio coordination in a software-defined network. In general, the system 500 enables multiple wireless users to transmit and receive data and other content. The system 500 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 500 includes user equipment (UE) 510a-510e, radio access networks (RANs) 520a-520b, a core network 530, a public switched telephone network (PSTN) 540, the Internet 550, and other networks 560, and one or more central processors or servers 580. While certain numbers of these components or elements are shown in FIG. 5, any number of these components or elements may be included in the system 500.

The UEs 510a-510e are configured to operate and/or communicate in the system 500. For example, the UEs 510a-510e are configured to transmit and/or receive via wireless or wired communication channels. Each UE 510a-

510*e* represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device, all which include and incorporate a browser application.

The RANs 520*a*-520*b* here include base stations 570*a*-570*b*, respectively. Each base station 570*a*-570*b* is configured to wirelessly interface with one or more of the UEs 510*a*-510*c* to enable access to the core network 530, the PSTN 540, the Internet 550, and/or the other networks 560. For example, the base stations 570*a*-570*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. UEs 510*d*-510*e* are configured to interface and communicate with the internet 550 and may access the core network 530, the PSTN 540, and/or the other networks 560, which may include communicating with the base station 570.

In the embodiment shown in FIG. 5, the base station 570*a* forms part of the RAN 520*a*, which may include other base stations, elements, and/or devices. Also, the base station 570*b* forms part of the RAN 520*b*, which may include other base stations, elements, and/or devices. Each base station 570*a*-570*b* operates to transmit and/or receive wireless signals within a particular geographic region or area, sometimes referred to as a "cell." In some embodiments, multiple-input multiple-output (MIMO) technology may be employed having multiple transceivers for each cell.

The base stations 570*a*-570*b* communicate with one or more of the UEs 510*a*-510*c* over one or more air interfaces 590 using wireless communication links. The air interfaces 590 may utilize any suitable radio access technology.

It is contemplated that the system 500 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 520*a*-520*b* are in communication with the core network 530 to provide the UEs 510*a*-510*c* with voice, data, application, Voice over Internet Protocol (VoIP), or other services. Understandably, the RANs 520*a*-520*b* and/or the core network 530 may be in direct or indirect communication with one or more other RANs (not shown). The core network 530 may also serve as a gateway access for other networks (such as PSTN 540, Internet 550, and other networks 560). In addition, some or all of the UEs 510*a*-510*c* may include functionality for communicating with different wireless networks over different wireless links using different wireless technologies and/or protocols. Instead of wireless communication (or in addition thereto), the UEs may communicate via wired communication channels to a service provider or switch (not shown), and to the Internet 550.

Although FIG. 5 illustrates one example of a communication system, various changes may be made to FIG. 5. For example, the communication system 500 could include any number of UEs, base stations, networks, or other components in any suitable configuration.

Figure 6A:
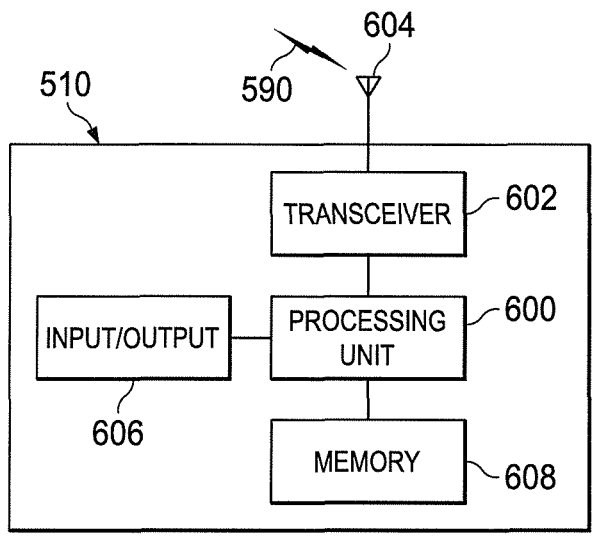
FIGS. 6A and 6B illustrate example devices that can implement on-demand radio coordination according to one embodiment.
Figure 6B:
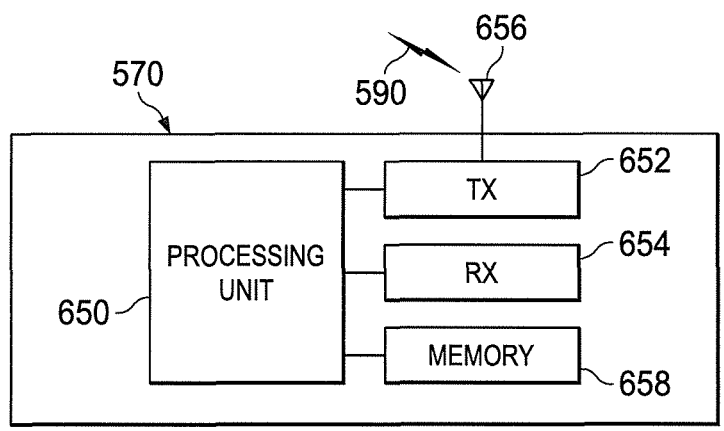

FIGS. 6A and 6B illustrate example devices that may implement the methods and teachings according to this disclosure. In particular, FIG. 6A illustrates an example UE 510, and FIG. 6B illustrates an example base station 570. These components could be used in the system 500 or in any other suitable system.

As shown in FIG. 6A, the UE 510 includes at least one processing unit 600. The processing unit 600 implements various processing operations of the UE 510. For example, the processing unit 600 could perform signal coding, data processing, power control, input/output processing, or any other functionality enabling the UE 510 to operate in the system 500. The processing unit 600 also supports the methods and teachings described in more detail above. Each processing unit 600 includes any suitable processing or computing device configured to perform one or more operations. Each processing unit 600 could, for example, include a microprocessor, microcontroller, digital signal processor, field programmable gate array, or application specific integrated circuit.

The UE 510 also includes at least one transceiver 602. The transceiver 602 is configured to modulate data or other content for transmission by at least one antenna 604. The transceiver 602 is also configured to demodulate data or other content received by the at least one antenna 604. Each transceiver 602 includes any suitable structure for generating signals for wireless transmission and/or processing signals received wirelessly. Each antenna 604 includes any suitable structure for transmitting and/or receiving wireless signals. One or multiple transceivers 602 could be used in the UE 510, and one or multiple antennas 604 could be used in the UE 510. Although shown as a single functional unit, a transceiver 602 could also be implemented using at least one transmitter and at least one separate receiver.

The UE 510 further includes one or more input/output devices 606 or interfaces (such as a wired interface to the Internet 550). The input/output devices 606 facilitate interaction with a user or other devices (network communications) in the network. Each input/output device 606 includes any suitable structure for providing information to or receiving/providing information from a user, such as a speaker, microphone, keypad, keyboard, display, or touch screen, including network interface communications.

In addition, the UE 510 includes at least one memory 608. The memory 608 stores instructions and data used, generated, or collected by the UE 510. For example, the memory 608 could store software or firmware instructions executed by the processing unit(s) 600 and data used to reduce or eliminate interference in incoming signals. Each memory 608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 6B, the base station 570 includes at least one processing unit 650, at least one transmitter 652, at least one receiver 654, one or more antennas 656, and at least one memory 658. The processing unit 650 implements various processing operations of the base station 570, such as signal coding, data processing, power control, input/output processing, or any other functionality. The processing unit 650 can also support the methods and teachings described in more detail above. Each processing unit 650 includes any suitable processing or computing device configured to perform one or more operations. Each processing unit 650 could, for example, include a microprocessor, microcontroller, digital signal processor, field programmable gate array, or application specific integrated circuit.

Each transmitter 652 includes any suitable structure for generating signals for wireless transmission to one or more UEs or other devices. Each receiver 654 includes any suitable structure for processing signals received wirelessly from one or more UEs or other devices. Although shown as separate components, at least one transmitter 652 and at least one receiver 654 could be combined into a transceiver. Each antenna 656 includes any suitable structure for transmitting and/or receiving wireless signals. While a common antenna 656 is shown here as being coupled to both the transmitter 652 and the receiver 654, one or more antennas 656 could be coupled to the transmitter(s) 652, and one or more separate antennas 656 could be coupled to the receiver(s) 654. Each memory 658 includes any suitable volatile and/or non-volatile storage and retrieval device(s).

Additional details regarding UEs 510 and base station 570 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method in a computing device for providing radio access network (RAN) coordination of network devices in a network, the method comprising:
    detecting, by the computing device, a congested radio node in a plurality of radio nodes in the network in response to congestion information received from a network device, wherein the congestion information comprises at least one of a delay associated with a quality of service requirement, a jitter associated with a quality of service requirement, an average resource allocation over a period of time, and an instantaneous rate of a flow in resource allocation;
    generating, by the computing device, a cluster of radio nodes associated with the congested radio node based on at least one of quality-of-service reports, quality-of-experience (QoE) reports, QoE status of users' applications, flow rate allocation, or spectral efficiency of radio nodes, the cluster of radio nodes comprising the congested radio node, a load-sharing node that transmits data to user equipments (UEs) served by the congested radio node, and a direct interfering node that causes interference to the UEs served by the congested radio node;
    selecting, by the computing device, radio resources of the radio nodes in the cluster to produce cluster optimization results based on the generated cluster of radio nodes and an optimization method, the cluster optimization results configured to alleviate congestion of the congested radio node; and
    transmitting, by the computing device, the cluster results to the radio nodes in the cluster to alleviate the congestion.

2. The method according to claim 1, wherein selecting the radio resources of the radio nodes in the cluster comprises selecting an adjusting technique in accordance with capabilities of the radio nodes.

3. The method according to claim 2, wherein the capabilities of the radio nodes include one or more of backhaul capacity, power control, coordinated spatial beamforming, and carrier selection.

4. The method according to claim 1, wherein the congestion information is received from a congestion detection server and is associated with a data rate of a traffic flow through a radio node in the cluster.

5. The method according to claim 4, wherein congestion at the radio node is detected in accordance with a delay associated with the traffic flow exceeding a quality of service requirement.

6. The method according to claim 1, wherein the congestion information is associated with a bandwidth of the congested radio node, wherein congestion at the congested radio node is detected in accordance with a required bandwidth of the congested radio node exceeding an available bandwidth of the congested radio node.

7. The method according to claim 1, wherein the cluster of radio nodes is generated based at least in part on a cost function associated with changing transmission parameters of one or more of the plurality of radio nodes in the network.

8. The method according to claim 1, further comprising:
    generating a plurality of clusters of radio nodes, each cluster associated with one or more congested radio nodes; and
    prioritizing the plurality of clusters in accordance with available resources of the computing device.

9. The method according to claim 8, further comprising prioritizing the plurality of clusters in accordance with quality of experience information associated with traffic flow through one or more of the radio nodes.

10. The method according to claim 1, further comprising:
    monitoring resource utilization of a radio node in the network; and
    in response to the resource utilization of the radio node being below a threshold value, lowering the resource utilization of the radio node without causing outage to current traffic flows.

11. The method according to claim 10, wherein a resource associated with the resource utilization includes at least one of spectrum and transmit power.

12. The method according to claim 1, wherein the optimization method is selected based on a size of the cluster of radio nodes and locations of UEs served by the cluster of radio nodes, and the optimization method optimizes operation parameters of the cluster of radio nodes.

13. An apparatus for providing radio access network (RAN) coordination of network devices in a network, the apparatus comprising:
  a processor; and
  memory coupled to the processor comprising instructions that, when executed by the processor, cause the apparatus to perform operations comprising:
    detecting a congested radio node in a plurality of radio nodes in the network in response to congestion information received from a network device, wherein the congestion information comprises at least one of a delay associated with a quality of service requirement, a jitter associated with a quality of service requirement, an average resource allocation over a period of time, and an instantaneous rate of a flow in resource allocation;
    generating a cluster of radio nodes associated with the congested radio node based on at least one of quality-of-service reports, quality-of-experience (QoE) reports, QoE status of users' applications, flow rate allocation, or spectral efficiency of radio nodes, the cluster of radio nodes comprising the congested radio node, a load-sharing node that transmits data to user equipments (UEs) served by the congested radio node, and a direct interfering node that causes interference to the UEs served by the congested radio node;
    selecting radio resources of the radio nodes in the cluster to produce cluster optimization results based on the generated cluster of radio nodes and an optimization method, the cluster optimization results configured to alleviate congestion of the congested radio node; and
    transmitting the cluster optimization results to the radio nodes in the cluster to alleviate the congestion.

14. The apparatus according to claim 13, further comprising instructions that, when executed by the processor, cause the apparatus to perform operations comprising:
  selecting an adjusting technique in accordance with capabilities of the radio nodes, wherein the capabilities of the radio nodes include one or more of backhaul capacity, power control, coordinated spatial beamforming, and carrier selection.

15. The apparatus according to claim 14, further comprising instructions that, when executed by the processor, cause the apparatus to perform operations comprising:
  generating a plurality of clusters of radio nodes, each cluster associated with one or more congested radio nodes; and
  prioritizing the plurality of clusters in accordance with available resources of the apparatus.

16. The apparatus according to claim 15, further comprising instructions that, when executed by the processor, cause the apparatus to perform operations comprising:
  prioritizing the plurality of clusters in accordance with quality of experience information associated with traffic flow through one or more of the radio nodes.

17. The apparatus according to claim 13, wherein congestion at the congested radio node is detected in accordance with a delay associated with at least one traffic flow through one or more of the plurality of radio nodes exceeding a quality of service requirement.

18. The apparatus according to claim 13, wherein the congestion information is associated with a bandwidth of the congested radio node, wherein congestion at the congested radio node is detected in accordance with a required bandwidth of the congested radio node exceeding an available bandwidth of the congested radio node.

19. The apparatus according to claim 13, wherein the cluster of radio nodes is generated based at least in part on a cost function associated with changing transmission parameters of one or more of the plurality of radio nodes in the network.

20. The apparatus according to claim 13, further comprising instructions that, when executed by the processor, cause the apparatus to perform operations comprising:
  monitoring resource utilization of a radio node in the network, wherein a resource associated with the resource utilization includes at least one of spectrum and transmit power; and
  in response to the resource utilization of the radio node being below a threshold value, lowering the resource utilization of the radio node without causing outage to current traffic flows.

21. A non-transitory computer readable medium embodying a computer program, the computer program comprising computer readable program code for:
  detecting a congested radio node in a plurality of radio nodes in a network in response to congestion information received from a network device, wherein the congestion information comprises at least one of a delay associated with a quality of service requirement, a jitter associated with a quality of service requirement, an average resource allocation over a period of time, and an instantaneous rate of a flow in resource allocation;
  generating a cluster of radio nodes associated with the congested radio node based on at least one of quality-of-service reports, quality-of-experience (QoE) reports, QoE status of users' applications, flow rate allocation, or spectral efficiency of radio nodes, the cluster of radio nodes comprising the congested radio node, a load-sharing node that transmits data to user equipments (UEs) served by the congested radio node, and a direct interfering node that causes interference to the UEs served by the congested radio node;
  selecting radio resources of the radio nodes in the cluster to produce cluster optimization results based on the generated cluster of radio nodes and an optimization method, the cluster optimization results configured to alleviate congestion of the congested radio node; and
  transmitting the cluster optimization results to the radio nodes in the cluster to alleviate the congestion.

* * * * *